Sept. 12, 1967
A. J. GIUFFRIDA ETAL
3,341,441
METHOD FOR PREVENTING SCALE BUILDUP DURING
ELECTRODIALYSIS OPERATION
Filed Jan. 7, 1964
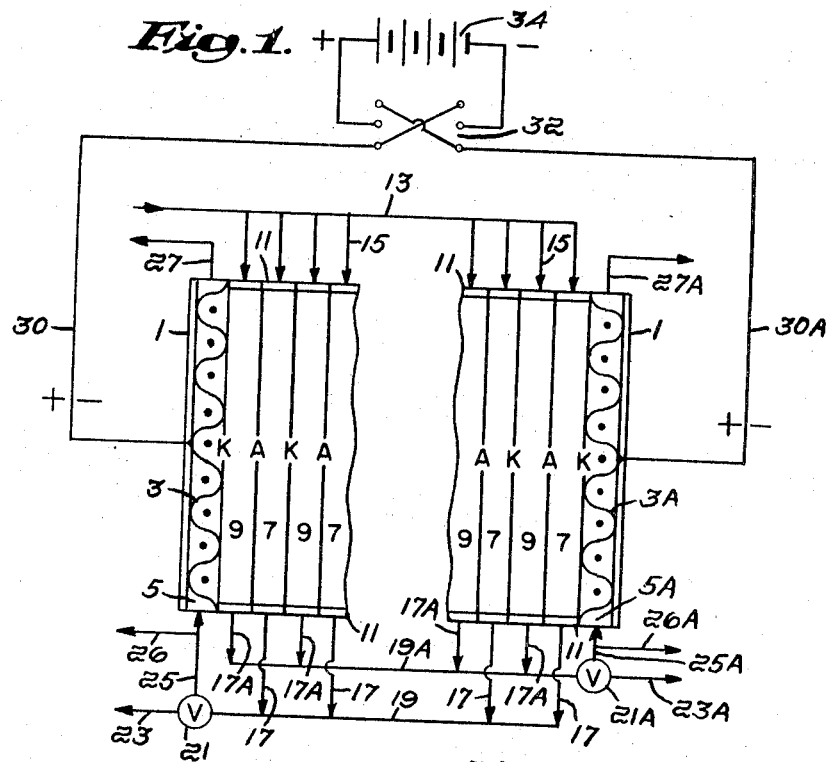
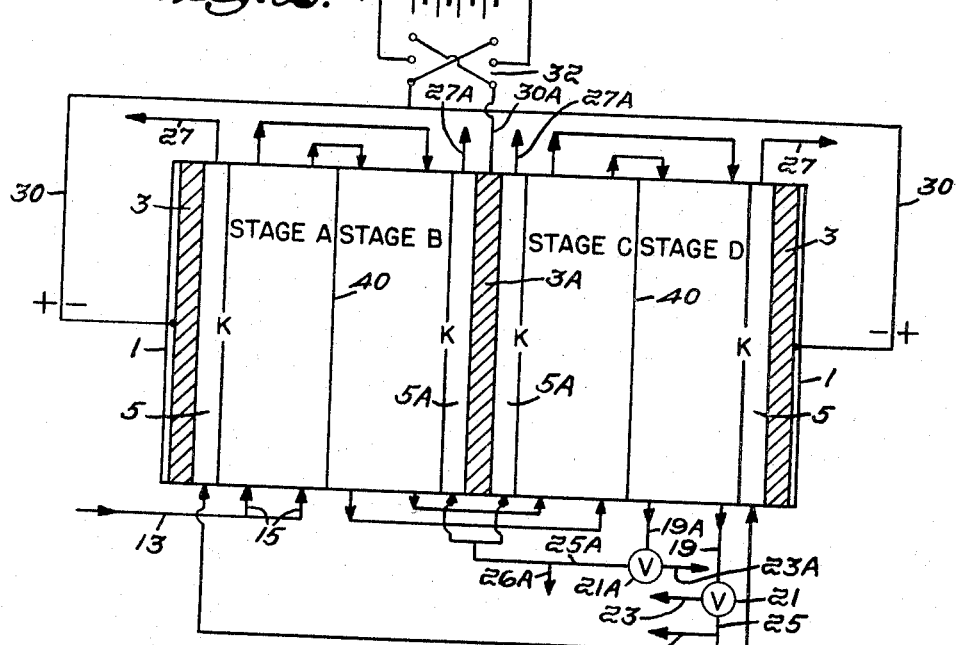
Inventors:
Anthony J. Giuffrida,
Edgardo J. Parsi,
by Aaron Tushin Attorney

United States Patent Office 3,341,441
Patented Sept. 12, 1967

3,341,441
METHOD FOR PREVENTING SCALE BUILDUP
DURING ELECTRODIALYSIS OPERATION
Anthony J. Giuffrida, North Andover, and Edgardo J.
Parsi, Cambridge, Mass., assignors to Ionics, Incorporated, Cambridge, Mass.
Filed Jan. 7, 1964, Ser. No. 336,157
7 Claims. (Cl. 204—180)

The invention relates to improvements in the apparatus and the process employed in the electrodialysis of electrolytic solutions and in particular to the prevention of salt scale accumulation in such apparatus. Specifically the present invention is directed to a novel manner of minimizing or completely preventing the objectionable buildup of scale in the electrode compartments during operation of an electrodialysis unit.

Electrodialysis apparatus and systems for removing undesirable ions from electrolytic solutions are well known in the art. Such apparatus has been used for example to remove salts from brackish and sea waters and from various industrial solutions or for substituting one ion for another. The electrodialysis process transfers electrically charged ions through permselective ion-exchange membranes or barriers as a result of the application of electrical energy. One form of an electrodialysis system for use in such processes comprises at least one anion membrane which is permeable to the passage of negatively charged ions and at least one cation membrane which is, in turn, permeable to the passage of positively charged ions. The ion-exchange membranes are disposed between an anode and a cathode and preferably separated from each other and from the electrode by so-called spacer members which define the liquid chambers of the electrolytic unit or apparatus. While a system utilizing a single anion and cation exchange membrane is feasible, in the commercial utilization of such systems a multicell unit is employed having a plurality of cation and anion membranes alternately stacked between two electrodes to form alternating desalting and concentrating chambers, thereby increasing the capacity and efficiency of the system. In addition, the electrodialysis apparatus contains at least two terminal electrode chambers containing an anode and cathode, respectively, for the passage of a direct current transversely through the body of the unit or apparatus. In operation, the dissolved ionized salts of a liquid are transferred through the appropriate membranes from the desalting chambers into the salt concentrating chambers. The salts collecting in the concentrating or waste chambers are carried away through discharge outlets while the solution in the desalting chambers is collected from discharge outlets as a liquid having a low salt content. The combination of a desalting and concentrating chamber constitutes a cell pair, thus multi-chamber electrodialysis units may comprise 100 cell pairs or more. In the multi-chamber units the desalting chambers are usually connected in parallel in one flow system, the waste chambers also in parallel in a second flow system and the electrode chambers as a rule by a third circulation system. Electrodialysis units and their method of operation are more fully described in U.S. Patents Nos. 2,708,658, 2,891,900 and many others, while the manufacture and properties of ion-selective membranes are disclosed in U.S. Patents Nos. 2,702,272, 2,730,768, 2,731,411 and others.

A known difficulty in the operation of electrodialysis stacks such as described above, consists in the fact that during treatment of naturally occurring waters, sugar solutions, industrial solutions, etc., a rapid clogging of the cathode electrode chamber occurs due to the formation of insoluble salts therein. Solutions containing appreciable quantities of calcium, magnesium and bicarbonate in contact with the basic environment of the cathode compartment will deposit as a relatively insoluble scale within the cathode compartment. This scale may form on the electrode itself, on the separator or spacer member forming the electrode compartments flow area or within the membrane adjacent to said cathode chamber. This scale consists, as a rule, mainly of the carbonates and hydroxides of the alkaline-earth metals, especially calcium, and any substantial deposit will increase the electrical and hydraulic resistance of the cathode compartment so as to lower the efficiency of the stack.

Various ways of overcoming this difficulty have been attempted or suggested. One such method is to chemically soften the water being fed to the cathode chamber as by lime-soda treatment. Another method is to make the feed stream to the cathode chamber acidic by adding to said stream an acid from an outside supply source. Both methods require the consumption of expensive chemicals which, or course, is undesirable. By another known method, the amount of cathodic scale formed is somewhat reduced by reversing at intervals the direction of the current, in which case the electrode once serving as the cathode becomes the anode and vice versa. The solution flowing through the anode chamber becomes acidic due to anodic electrolytic action, the acid formed thus tending to dissolve a small portion of scale formed therein during the time the electrode was cathodic. Mere polarity reversal employed as an adjunct to the coventional methods of cell operation is not too successful over any extended period of time. In conventional cell operation there is a continuous flow of solution through the anode chamber so that the acid generated is removed quickly and never becomes sufficiently concentrated therein to effectively dissolve any scale formed during the previous cathodic cycle. Eventually, on extended operation, the scale deposit builds up to cause electrical and hydraulic blockage of the electrode chamber resulting in a shut-down.

It is, therefore, the object of the present invention to provide an improved method whereby salt scale buildup in the electrode chambers or compartments of an electrodialysis unit is substantially prevented.

Another object is to eliminate the necessity of adding an external source of acid to the liquid stream entering the electrode chambers of an electrodialysis apparaus.

Another object is to maintain clean cathode chambers by a simple and reliable method which will obviate the need of frequent shutdowns for cleaning of scale from the electrode chambers.

Another object is to prevent or minimize scaling in the membranes and chambers adjacent to the electrode chambers.

Another object is to increase the efficiency of an electrodialysis unit.

Various other objects and advantages will appear from the description of the invention and the novel features will be particularly pointed out hereinafter in connection with the appended claims. For a fuller understanding of the invention, reference should be made to the following detailed disclosure taken in conjunction with the accompanying drawings in which:

FIGURE 1 is a vertical cross-section of a multi-cell electrodialysis unit showing the direction of flow of solution through the unit; and FIGURE 2 is a modified form of apparatus employing a common electrode and internal staging.

In general the invention comprises an electrodialysis apparatus that is designed and operated in a manner so as to prevent or reduce any significant buildup of scale formation in the chambers of an electrodialysis unit, particularly the electrode chambers. The objects of the invention are achieved by a novel combination of steps working in close cooperation. Each step, when linked in its proper sequence, will materially assist in the ultimate prevention of scale accumulation. The essential steps of the process involve: (1) allowing the acid generated within the anode chamber to reach a sufficiently high concentration in said chamber so as to dissolve precipitated solid formed therein during the electrode's previous cathodic cycle, and (2) reversing the polarity of the direct current at periodic intervals. Preferably a third step should also be employed; that is the step of continuously flushing the cathode compartment or chamber with a sufficiently large volume of electrolyte solution to quickly remove the base generated therein. We have found that the use of the first two steps will prevent scale buildup and plugging for a time but preferably all three steps should best be employed together in their proper sequences to allow continuous operation for substantial periods of time.

Referring now to the drawings, there is shown schematic vertical sections of multi-cell electrodialysis units for which the present invention may be advantageously applied. It will be apparent that electrodialysis systems and structures other than those shown can advantageously employ the present invention as, for example, electrodialysis apparatus for the decontamination of radioactive liquids such a milk. It is to be understood that the configuration of membranes and chambers that can be arranged between electrode containing chambers may be modified in various respects without departure from the principles of the invention. The drawings illustrate apparatus containing conduits and valves for passing solutions into and out of the units in various directions and employing the principle of periodic reversal of the direction of the direct current. Corresponding reference characters refer to corresponding parts of the several figures. The units illustrated, particularly that of FIGURE 1, comprise insulated ends walls 1 and electrodes 3 and 3A; the electrodes being disposed in electrode chambers or compartments 5 and 5A. Ion-selective membranes of cations K and anions A are alternately placed between the electrode chambers and are selectively permeable to the passage of positive and negative ions, respectively. The membranes subdivide the space between the electrode chambers into adjoining chambers 7 and 9; the membranes being separated from each other by gasketing spacer members 11. In the embodiment shown, the membranes nearest the electrodes are cation membranes. Where, in FIGURE 1, the polarity of the direct current is such that the anode or positive electrode is located on the left hand side of the drawing and that of the cathode on the right, there is thus defined therebetween a plurality of intermediate chambers comprised of desalting or diluting chambers 7 and concentrating or waste chambers 9. Thus the chamber adjoining the anode chamber 5 is a concentrating chamber 9 and on the other end of the unit adjoining the cathode chamber 5A is a diluting chamber 7. Means for supplying liquid to the chambers 7 and 9 are provided for by a common manifold inlet 13 which divides into conduits 15 for separately feeding each chamber. The solution to be treated may be passed into the electrodialysis unit continuously or batch-wise, in series, or in parallel flow, or in various other ways that are well known in the art. Where the feed solution to chambers 7 and 9 are dissimilar in salt concentration or of different liquids, it is necessary that a separate manifold inlet connect each set of alternate compartments so that one set of compartments 7 be fed from a first manifold and the other set 9 by a second manifold. In such a system employing separate manifold inlets, it is necessary that on reversal of current the separate and different feed solution streams be interchanged by stream reversal means such as for example a hydraulic reversal valve (not shown). These valves are employed to divert the diluting feed stream from one set of chambers to the alternate set during the two half cycles and simultaneously divert the concentrating feed stream in the exact opposite manner.

In both cycles, the flow to the electrode chambers is also reversed so that the former anode (presently the cathode) is now being flushed with a stream of electrolyte solution and the former cathode (presently the anode) will have no liquid flow therethrough or, at most, only a minor flow. In this way each electrode chamber will alternate as an anode chamber, during which time the solution flow to the anode chamber is reduced so that the acid formed therein is effective in breaking and dissolving the hardness scale formed during the interval when the electrode functioned as the cathode.

As the solution passes through the chambers of the electrodialysis unit, the ions present in the diluting chambers 7 are removed therefrom by ion-transfer and the resulting purified or dilute stream is discharged via conduits 17 into a common discharge manifold 19 which, in turn, passes into stream diverting means 21 which may, for example, be a three-way solenoid valve. The solenoid valve 21 can direct solution out through a withdrawal conduit 23 or into electrode chamber 5 by means of inlet conduit 25. Where desired, a portion of the solution entering inlet conduit 25 may be withdrawn therefrom via take-off conduit 26. The outlet pipe 27 located on top of electrode chamber 5 is employed for the removal of liquid and gases therefrom. Similarly, the solution supplied to the second set of chambers 9, which in the case illustrated would be the concentrating chambers, will pick up ions that have migrated therein from the diluting chambers 7. This concentrated salt solution is discharged from the concentrating chamber via conduits 17A, into a common discharge manifold 19A and then into solenoid valve 21A. Two conduit lines pass out from valve 21A, one line 25A leading into electrode chamber 5A and the other line 23A leading away from the apparatus as a withdrawal conduit. Line 25A is provided with take-off conduit 26A which may be employed for bleeding out a portion of the solution entering line 25A. Liquids and gases from electrode chamber 5A are discharged therefrom via outlet pipe 27A. The solenoid valves are electrically connected and phased with the polarity reversal switch 32 (said connection not being illustrated in the drawing) and allows the solution passing out from each set of chambers to be collected, or, in the alternate, to be directed into the electrode chambers. Leads 30 and 30A connect the electrodes with a polarity reversal switch 32 and a source of direct current 34. To prevent confusion, the apparatus have not been illustrated with the usual pumps, flowrators and valves which are understood in the art to be employed in conjunction with electrodialysis units.

The invention can also be advantageously employed in electrodialysis units which have been modified in design. One such modification is "internal staging" whereby the effluent solution of one set of diluting and concentrating chambers is passed as the influent feed to a subsequent set of diluting and concentrating chambers that are located within the same electrodialysis unit and between one pair of electrodes. Such a set of diluting and concentrating chambers is termed a "stage" and the apparatus can combine a plurality of stages between two end electrodes. Another variation is to insert an electrode intermediate between two of said stages. This electrode becomes common to both stages, that is current will flow in opposite directions through the adjoining stages between the end electrode of one charge and the intermediate common electrode of opposite charge. The common electrode may be either a common anode, a common cathode or a succession of common electrodes inserted between various stages.

Such an internally staged unit is illustrated in FIGURE 2 and is shown comprising four internal stages, A, B, C and D, separated into two groups by a common electrode 3A. Each stage comprises a plurality of diluting and concentrating chambers defined by alternating cation and anion membranes, as was previously described in reference to FIGURE 1. Any number of common electrodes 3A may be placed between the end electrodes 3 of the unit and any number of stages may be included between any two electrodes. In the apparatus of the drawing, each group of stages, comprised of stage A and B for one group and stage C and D for the second group, are defined by a common electrode 3A and an end electrode 3. Each individual stage of a group is separated from each other by an ion-selective membrane 40. The two end electrodes 3 would be at any one time similarly charged whereas the common electrode 3A would be oppositely charged. Conduits 15 are employed for passing the liquid to be desalted and concentrated into stage A. The effluent from the diluting chambers of stage A is combined and passed as the influent to the diluting chambers of the next stage B. This flow arrangement occurs throughout the diluting chambers of all subsequent stages. Likewise the flow of concentrating effluent solution from stage A is directed through all subsequent stages in a manner similar to that of the diluting stream. The flow of solution from stage to stage may be by internal manifolding or, as shown in FIGURE 2, by an external manifold arrangement. The solutions leaving the last stage of the unit are combined as separate diluting and concentrating streams 19 and 19A and passed into stream diverting valves 21 and 21A. These valves allow the streams to either pass out of the system via conduits 23 and 23A and be collected, or directed as a feed stream into the electrode chamber or chambers via conduits 25 and 25A.

As previously pointed out, this invention may be applied to electrodialysis apparatus other than the types particularly described herein. It is not required that the electrodialysis units have a regularly alternating cation and anion membrane arrangement so as to define alternating ion-diluting and ion-concentrating chambers. The particular sequence or arrangement of the membranes situated between electrode containing chambers does not alter the utility or principle of the invention. An electrodialysis unit may, for example, be comprised of not only diluting and concentrating chambers but also ion-neutral chambers. Such apparatus is fully described in co-pending application, Ser. No. 199,691 filed June 8, 1962, in the names of Edgardo J. Parsi and Stuart G. McGriff and it is intended that the disclosure of Ser. No. 199,691 be incorporated by references into this present application. In Ser. No. 199,691 there are disclosed various electrodialysis apparatus which are especially adaptable for removing radioactive contaminating ions from milk while simultaneously replacing the removed contaminating ions with non-radioactive ions. One such apparatus, for example, is comprised of a plurality of repeating groups of chambers disposed between end electrodes. Each group is comprised of three juxtaposed chambers with the center chamber being defined on both sides by ion-exchange membranes of the same selectivity. The chamber on each side of the center chamber is bound on its outer side by an ion-exchange membrane having a selectivity opposite to those membranes defining the center chamber. Such an arrangement of membranes defines a three-chamber group of a concentrating (waste) chamber, a neutral (decontaminating) chamber and a diluting (reconstituting) chamber and is adaptable for removing either cationic or anionic contaminants from milk.

The invention will now be described in particular to the desalting of brackish water employing the unit of FIGURE 1. Initially, all the chambers of the unit are filled with the water and thereafter said brackish water is fed continuously into the diluting and concentrating chambers via common manifold inlet 13 from a brackish water source (not shown). When a direct current is impressed across the electrodes 3 and 3A, the ions located in the diluting compartments migrate through the appropriate membranes into the adjacent concentrating compartments. Where the polarity is such that electrode 3 is the anode and 3A the cathode, then a first set of alternating chambers becomes the diluting chambers 7 and a second set becomes concentrating chambers 9. During this first polarity cycle, hydrogen ions are constantly being formed at the anode 3 and hydroxyl ions at the cathode 3A. The desalted water from the diluting chambers is withdrawn at conduits 17, collects in common discharge manifold 19, passes into valve 21 and out through conduit 23 where it is collected as a purified water product. Valve 21 is arranged so that no purified solution is allowed to pass into anode chamber 5 by way of conduit 25. Preferably there is no flow of solution into the anode chamber; thus the acid being generated therein is not washed out of the chamber so that hydrogen ion concentration continuously increases during this polarity cycle period. Operating the unit in a vertical position, as shown in the drawings, will allow the anodic gas formed to rise up to the top of the anode chamber and out through pipe 27. If desired, a small flow of electrolyte solution from the diluting effluent stream may be passed into the anode chamber 5 to assist in removing the electrode gases out through pipe 27. However, this flow should not be so great as to prevent the acid concentration of the anolyte from attaining a pH of at least about 4.

The salt waste solution from the concentrating chambers 9 is withdrawn through conduits 17A and combines in common discharge manifold 19A. The waste solution then passes into valve 21A where it is diverted through conduit 25A as the feed solution to the cathode chamber 5A. This solution and any gases resulting from the cathode process pass out of the cathode chamber through conduit line 27A.

The quicker the hydroxyl ions are removed from the cathode chamber, after being generated, the less chance for scale formation to occur. Rapid flushing of the cathode chamber with large volumes of solution will greatly dilute the basic environment therein and will often remove any loosely adhering scale. The volume of flushing solution can vary within wide limits but in general the greater the volume employed, the more effective will the base be flushed out of the cathode chamber. It is desirable to maintain as large a flow rate through the cathode chamber as is reasonably possible under the conditions of operation but not so high as to cause serious deformation of the membrane adjacent to said chamber. The greater the number of electrical Faradays employed during operation, the greater the generation of hydroxyl ions and thus the larger the volume of flushing solution desired. Preferably the flushing solution should be slightly acid and therefore the use of the concentrate effluent stream as the flushing solution is desirable especially where cation membranes are employed at the electrode chambers. This cation membrane arrangement allows some of the hydrogen ions formed at the anode to migrate into the adjacent concentrating chamber to add a slight acidity to the concentrate stream. For convenience in unit operation, the flushing of the cathode is most expeditiously conducted by allowing the total volume of waste effluent solution to pass through the cathode chamber in a single pass and then disposed as a waste solution. Of course the cathode flushing may employ an outside source of electrolyte solution in place of the waste stream although in most cases this would not be advantageous. Preferably the pH of the solution withdrawn from the cathode chamber after attaining steady-state operation should not be greater than about 9.5. Increasing the solution flow to the cathode chamber will readily allow regulation of the solution pH of the cathode chamber effluent. The desirable flow rate is easily determined by measuring at intervals the pH of the solution passing out of the cathode chamber. The simple flow of a large volume of solution through the cathode compartment is not adequate in itself to adequately prevent scale buildup but must be combined with polarity reversal and anodic acid buildup to be effective.

After the unit has operated on the first polarity cycle for a certain period of time, the direct current is then reversed by manual or automatic operation of switch 32. Where the reversal is automatic, a timer motor activating means (not shown) can be employed in connection with the switch. During this second polarity cycle, the electrode 3 now becomes the cathode and electrode 3A the anode. Simultaneously the chambers of the unit interchange functions so that the first set of alternating chambers 7 now becomes concentrating chambers and the second set of chambers 9 becomes diluting. The valves 21 and 21A which are phased with the polarity of the electrodes by means well known per se will also change functions with each other. The waste stream now enters solenoid valve 21 which is now activated to allow at least part of the waste stream, but preferably its total volume, to flush through cathode chamber 5 via line 25. Solution and gases are removed from the cathode chamber at line 27. The dilute effluent solution now collects in withdrawal manifold 19A, enters valve 21A, which is activated to allow passage of liquid out at line 23A as product water. Valve 21A functions to prevent the flow of any dilute effluent through line 25A and into the anode compartment 5A. No solution flow to the anode chamber insures obtaining a hydrogen ion concentration in the anolyte which is sufficiently high to dissolve scale which may have formed in this electrode compartment 5A during the previous cathodic cycle. An alternate method is to flow diluting effluent into the anode chamber but at a flow rate sufficiently small so as to allow the acidity of the anolyte to build up to at least about pH 4 or better prior to reversing polarity once again. It is critical to proper operation that the flow rate to the anode chamber be stopped, or at least considerably diminished, to allow for the maintenance of a sufficient acid buildup therein for effective scale dissolution. The actual pH of the anolyte will vary depending on the solution flow, the number of electrical Faradays employed and also the time interval of each polarity reversal cycle. Where there is no liquid flow to the anode compartment or where it is so small as to be insufficient to flush out the gases formed therein, it is necessary that means or steps for gas removal be employed. Simply operating the unit in a vertical position has been found to allow the electrode gases to rise vertically out of the top of the electrode chambers by way of outlet pipes 27 or 27A.

During the second polarity reversal cycle, the electrode 3 which was formerly acting as an anode becomes the cathode and, in turn, the former cathode 3A becomes the anode. In this situation acid is now formed in close proximity to the scale film which had formed during the previous cathodic cycle of the present anode electrode 3A. The greater the acidity of the anolyte, the more rapid will the formed scale be dissolved. In operation, the scale may break off in irregular pieces and will continually dissolve in the acid which is being constantly formed. It is not always necessary that the scale be completely dissolved during the anodic cycle. When the pieces become small enough in size, they can often be passed out of the electrode chamber by a rapid flushing of solution therethrough during the cathodic cycle, as has been heretofore described. Preferably the polarity reversal should operate on substantially equal time intervals; however, at times it may be desired that both polarity reversal cycles not be of equal duration. The period between each reversal may be varied considerably and from experiments it has been determined that it should not extend beyond about 5 hours. Operating much beyond this limit will allow a substantial buildup of scale at the electrode functioning as the cathode so that electrical reversal and acid buildup may no longer be effective in dissolving the scale accumulation. Operating in one direction for periods up to about 5 hours will limit the quantity of scale formation so that on reversal to the anode cycle the acid generated will successfully purge out the electrode chamber without the addition of an outside source of acid. In practice it has been found more desirable to operate on reversal cycles of about from 10 to 100 minutes.

The drawings are illustrated with cation perm-selective membranes adjacent to each electrode chamber but it should be understood that the invention is not limited to such an arrangement alone. However, cation membranes are preferred in this position to that of anion membranes. Where a cation perm-selective membrane is adjacent to the cathode chamber, the migration of the negatively charged hydroxyl ions of the catholyte through the membrane and into the next adjacent chamber is prevented or at least hindered. An anion perm-selective membrane placed facing the cathode would readily allow passage of hydroxyl ions therethrough. Thus, in the use of an anion membrane, there is present the inherent danger of scale formation within said membrane and in the adjacent chamber due to the basic environment created therein. The use of a cation perm-selective membrane adjacent to the anode is also advantageous. This arrangement allows the positively charged hydrogen ions of the anolyte to migrate through the membrane into the adjacent concentrating chamber. The passage of the hydrogen ions will dissolve any scale that may have formed within the membrane during the cycle when the membrane was adjacent to the basic catholyte. Additionally, where the concentrating effluent stream is employed as the flushing solution through the cathode chamber, any hydrogen ions that have migrated into the concentrating stream will be effectively utilized to neutralize at least some portion of the base being formed at the cathode.

The electrodes employed in the electrodialysis apparatus are made of a chemically-resistant conductive material and may be, for example, platinum, rhodium, etc., or, in the alternate, columbium or titanium coated with a noble metal. These electrodes may be of a flat non-foraminous design (see FIGURE 2) which is the type conventionally incorporated into electrodialysis units. These electrodes are usually positioned and fixed to one side of the electrode chamber. For purposes of this invention it has been found advantageous to use a foraminous electrode fabricated in the form of screen mesh or preferably as an expanded metal sheet. The expanded electrode as illustrated in FIGURE 1 is placed so as to fill the electrode chamber and, as such, will physically support the adjacent membrane and also function as a spacer to allow turbulent flow of liquid through the electrode chamber. The usual type of spacers employed in electrodialysis units for defining the liquid flow chambers and for membrane support are made of a non-conductive material such as plastic and therefore electrically inactive. These spacers usually have a defined liquid flow area therein, such as, for example, a tortuous path. Where the plastic type of spacer is used in the electrode chamber, any scale that may form on the spacer will not dissolve as readily as scale which is formed on an electrically active material such as expanded metal. During the anodic cycle of an expanded electrode, the hydrogen ions are formed in high concentrations directly under the scale which may be coating the electrode, resulting in a more effective dissolution of said scale. Expanded metal is commercially available and when employed as an electrode it is fabricated from an electrolytic valve metal and coated with precious metal. Expanded metal is manufactured from sheets that have been provided with alternate rows of short incisions. The sheet is stretched or expanded perpendicular to the direction of the incisions to form rhombic shaped holes. The finished sheet will then have a corrugated or regularly bumpy pattern on both surfaces. Where expanded metal is employed it functions to replace the usual type of spacer members and since the expanded material does not define a definite liquid flow path, the whole area is advantageously open for the flow of liquid or gases.

A further understanding of the present invention will be obtained from the following examples which are intended to be illustrative and not limiting the scope of the invention:

EXAMPLE 1

An electrodialysis unit constructed similar to that shown in FIGURE 1 was operated on a feed solution of 2000 p.p.m. scaling water. The feed solution had a pH of about 7.5 and a composition, on an equivalent weight basis, as follows:

*Cations*

| | Percent |
|---|---|
| Sodium | 33.3 |
| Calcium | 33.3 |
| Magnesium | 33.3 |

*Anions*

| | Percent |
|---|---|
| Chloride | 43 |
| Sulfate | 43 |
| Bicarbonate | 14 |

The unit or stack comprised five diluting and concentrating chambers (five cell pairs) and terminal electrode chambers containing expanded titanium electrodes coated with platinum. The expanded metal also served as the spacer member filling the electrode chambers and as physical support for the cation membranes adjacent thereto. The membranes defining the dilute and concentrating chambers were about 0.6 mm. thick. The cations adjacent to each electrode were 1.5 mm. thick. Three-way solenoid valves were located in the dilute and concentrating effluent lines to allow for alternation of liquid flow to the electrode chambers. The solenoid valves were phased with the polarity of the electrodes so that the total volume of effluent solution from the five concentrating chambers was made to pass through the cathode chamber to effect flushing therein. No flow of solution to the anode chamber was employed so as to allow the acid generated therein to build up to a concentration sufficient to dissolve the scale deposited within the anode chamber during the electrodes previous cathodic cycle. Actual measurement of the acid concentration of the anolyte solution just prior to the time polarity reversal occurred gave pH readings of about 1.3 to 1.5. A direct current of about 3.0 amperes (membrane current density of about 13.6 ma./cm.$^2$) was impressed across the electrodes with equal polarity reversals occurring about every 15 minutes. The feed solution flowed through the spacers of the dilute and concentrating chambers at about 40 cm./sec., or about 775-800 ml./minute. The unit operated successfully for seven days at about a 33% salt removal. Inspection of the chambers, especially the electrode chambers, revealed no significant scale accumulation therein.

EXAMPLE 2

A four stage electrodialysis stack similar to that shown in FIGURE 2 was fabricated with a common electrode separating the stages into two groups. The unit, or stack, comprised a total of 28 cell pairs with stages A, B, C and D containing respectively 9, 5, 9 and 5 cell pairs. The common electrode separated stages A and B from stages C and D. The unit operated on the same solution used in Example 1 at a liquid linear velocity of about 25 cm./sec. for the 9 cell pair stages and about 40 cm./sec. for the smaller 5 cell pair stages. The solution flow from stage to stage was in series at a rate of about 775-800 milliliters per minute for the dilute and concentrating streams. The end pair of electrodes was electrically connected in parallel and a variable rheostat put in series with stages C and D to allow current control therethrough to be independent of the current to stages A and B. The total concentrating effluent solution amounting to about 800 millimeters per minute was split into two separate streams of about equal volume with each stream employed to flush out a cathode chamber. No solution was flowed into the anode chambers during this run so that the level of the anolyte was maintained at about the level of the anode chambers effluent hole, with the gaseous products of anodic oxidation such as chlorine gas being allowed to rise to the top of the chamber and escape. By not employing liquid flow to the anode chambers, the necessary accumulation of acid is assured for effectively dissolving any scale that may form therein during the electrode's cathodic cycle. The unit operated with the membranes in a vertical position and with the solution inlets and outlets to the electrode chambers placed respectively at the bottom and top of the chambers. This position allowed more effective gas removal from the electrode chambers.

Stages A and B operated at about 2 amperes (10 milliamps per square centimeter of membrane area) and stages C and D at half that current. The unit produced 280–410 p.p.m. water of a pH of 6.7–6.9 with polarity reversal occurring at 15 minute intervals. The salt waste stream on a single pass through the cathode chamber gave a pH of 7.8. The anolyte pH prior to reversing the polarity measured about 1.8 for the higher current density anode and 1.9 for the lower density anode. During the test run there were no important changes in the demineralization or hydraulic characteristics of the stack. After 40 days of operation, the unit was disassembled and visually inspected. No significant accumulation of scale was noted in the electrode chambers. The unit was reassembled and operation was continued using a polarity reversal period of 30 minutes. This longer cycle did not materially affect the performance of the stack but did, however, allow a greater concentration of acid to accumulate in the electrode chambers. The anode operating on the higher current density produced an anolyte pH of 1.3 and for the lower current density anode a pH of 1.8. Inspection of the electrode chambers after 47 days of continuous operation showed negligible scale accumulation.

We claim:
1. In the method of substantially preventing scale buildup in the electrode chambers of an electrodialysis apparatus during the electrolytic transfer of ions from one solution to another solution in an apparatus comprising a plurality of spaced membranes arranged between two electrodes to define liquid containing chambers and wherein a direct current is passed across said membranes and liquid, the improvement comprising periodically reversing the polarity of the direct current and simultaneously reducing the rate of flow of electrolyte solution to the anode chamber to allow the acid generated in said anode chamber to reach a concentration sufficient to substantially dissolve any scale contained therein.

2. The method according to claim 1 wherein an electrolyte solution is continuously passed through the cathode chamber and wherein the flow of electrolyte solution to the anode chamber is reduced to an amount whereby the acid generated in the anolyte will attain a concentration of at least about a pH of 4.

3. In the method of substantially preventing scale buildup in the electrode chambers of an electrodialysis unit during the demineralization and concentration of dissolved salts of an ionic solution by passing said solution into the chambers of a multi-chamber unit containing a plurality of alternately spaced cation and anion perm-selective membranes arranged between two electrode containing chambers so as to define alternating diluting and concentrating chambers, passing a direct current from electrode to electrode across said membranes and chambers, withdrawing desalted product from said diluting chambers and salt concentrated product from said concentrating chambers, the improvement comprising periodically reversing the direction of said current and simultaneously reducing the rate of flow of electrolyte solution to the anode chamber to allow the acid generated in said chamber to reach a concentration sufficient to substantially dissolve any scale contained therein and passing an electrolyte solution through the cathode chamber.

4. In the method of substantially preventing scale buildup in the electrode chambers of an electrodialysis unit during the demineralization and concentration of dissolved salts of an ionic solution by passing said solution into the chambers of a multi-chamber unit containing a plurality of alternately spaced cation and anion perm-selective membranes arranged btcween two electrode containing chambers so as to define alternating diluting and concentrating chambers, passing a direct current from electrode to electrode across said membranes and chambers, withdrawing desalted product from said diluting chambers and salt concentrated product from said concentrating chambers, the improvement comprising periodically reversing the direction of said current, simultaneously reducing the flow of electrolyte solution to the anode chamber in an amount whereby the anolyte will attain an acid concentration of at least about pH of 4 during each polarity cycle and passing through the cathode compartment an electrolyte solution.

5. The method according to claim 4 wherein the electrolyte solution is flushed through the cathode compartment at a volume sufficient to prevent the catholyte effluent from reaching a basicity of greater than about a pH of 9.5.

6. In the method of substantially preventing scale buildup in the electrode chambers of an electrodialysis unit during the demineralization and concentration of dissolved salts of an ionic solution by passing said solution into the chambers of a multi-chamber unit containing a plurality of alternately spaced cation and anion permselective membranes arranged between two electrode containing chambers so as to define alternating diluting and concentrating chambers, passing a direct current from electrode to electrode across said membranes and chambers, withdrawing desalted product from said diluting chambers and salt concentrated product from said concentrating chambers, the improvement comprising periodically reversing the direction of said current at time intervals not greater than about five hours, substantially stopping the flow of solution to the anode chamber and passing through the cathode chamber an electrolyte solution from the concentrated effluent stream of said unit.

7. The method of claim 6 wherein the total volume of the concentrated effluent stream of the electrolysis unit is passed through the cathode chamber and wherein the polarity reversals occur at intervals of about between 10 to 100 minutes.

References Cited
UNITED STATES PATENTS

| | | | |
|---|---|---|---|
| 943,187 | 12/1909 | Hartman | 204—149 |
| 2,863,813 | 12/1958 | Juda et al. | 204—180 |
| 3,099,615 | 7/1963 | Kollsman | 204—180 |

OTHER REFERENCES

Cooke: Chemistry and Industry, "Scaling Problems in Electrodialysis Using Permselective Membranes," May 1958, pages 555–556.

JOHN H. MACK, *Primary Examiner.*

E. ZAGARELLA, *Assistant Examiner.*